United States Patent
Jürgensmeyer et al.

(10) Patent No.: US 7,562,754 B2
(45) Date of Patent: Jul. 21, 2009

(54) FRICTIONAL CLUTCH FOR AN ELEMENT WHICH CAN BE DRIVEN, IN PARTICULAR FAN WHEEL

(75) Inventors: Jan Jürgensmeyer, Markdorf (DE); Rainer Krafft, Heiligenberg (DE)

(73) Assignee: Linnig Trucktec GmbH, Markdorf (DE)

(*) Notice: Subject to any disclaimer, the term of this patent is extended or adjusted under 35 U.S.C. 154(b) by 177 days.

(21) Appl. No.: 11/302,969

(22) Filed: Dec. 14, 2005

(65) Prior Publication Data
US 2006/0151276 A1  Jul. 13, 2006

(30) Foreign Application Priority Data
Jan. 11, 2005 (DE) .................. 10 2005 001 330

(51) Int. Cl.
*F16D 27/01* (2006.01)
*H02K 49/04* (2006.01)
(52) U.S. Cl. .............. 192/48.2; 192/48.3; 192/84.3; 192/DIG. 1; 310/105
(58) Field of Classification Search ........ 192/84.3, 192/DIG. 1
See application file for complete search history.

(56) References Cited

U.S. PATENT DOCUMENTS

| 1,936,029 | A | * | 11/1933 | Ruesenberg | ............. 192/70 |
| 4,260,047 | A | * | 4/1981 | Nels | ............. 192/70.14 |
| 5,435,425 | A | * | 7/1995 | Ijames | ............. 192/13 R |
| 5,586,636 | A | * | 12/1996 | Linnig | ............. 192/48.2 |
| 5,691,589 | A | | 11/1997 | Keim et al. | |

FOREIGN PATENT DOCUMENTS

| DE | 42 07 709 A1 | 9/1993 |
| DE | 195 17 959 C1 | 8/1996 |
| DE | 696 04 537 T2 | 3/2001 |

* cited by examiner

*Primary Examiner*—Richard M. Lorence
*Assistant Examiner*—Edwin A. Young
(74) *Attorney, Agent, or Firm*—Burr & Brown

(57) ABSTRACT

A friction clutch for a driven element is proposed, wherein the driven element can clutch be connected directly to a drive and can be matched to the speed of the drive by means of a friction disk clutch. According to the invention, an eddy-current clutch which can be activated or deactivated is provided by respectively mounting or removing at least one part (1, 12) of the eddy-current clutch by means of a quick-action connection (6, 10). It is also proposed that an eddy-current and/or permanent magnet means (1, 12) is distributed in an azimuthal or circumferential manner.

17 Claims, 10 Drawing Sheets

000# FRICTIONAL CLUTCH FOR AN ELEMENT WHICH CAN BE DRIVEN, IN PARTICULAR FAN WHEEL

FIELD OF THE INVENTION

The invention relates to a friction clutch for a driven element, in particular for a fan impeller.

BACKGROUND OF THE INVENTION

Friction clutches of the type indicated in the introduction have already become known in a very wide range of embodiments.

Friction disk clutches of this type are frequently used for driving a fan impeller on an internal combustion engine in a motor vehicle. The fan impeller is switched on or off by means of the friction clutch as a function of temperature.

SUMMARY OF THE INVENTION

It is the object of the invention to provide a friction clutch of the type indicated in the introduction which has expanded functionality compared to the prior art.

The invention proceeds from a friction clutch for a driven element, in particular for a fan impeller of, for example, a motor vehicle internal combustion engine, in which the driven element can be connected directly to a drive and can be matched to the speed of the drive by means of a friction disk clutch. A significant aspect of the invention is that an eddy-current clutch, which can be activated or deactivated, is provided by respectively mounting or removing at least one part of the eddy-current clutch by means of a quick-action connection. This approach has the advantage that, if required, in addition to an operating state in which the driven element is switched on or off, a further operating state is possible in which, with the friction disk clutch disengaged, the driven element is driven to a take-up speed. In motor vehicle internal combustion engines, it is thus easily possible by means of the approach according to the invention, for example, to drive the friction clutch as a single-stage clutch in winter mode but as a two-stage clutch in summer mode when there is a greater demand for cooling, by virtue of the fact that a specified part of the eddy-current clutch can be mounted with just a small number of manual operations.

In addition, quick mounting and removal of a part of the eddy-current clutch can be advantageous in terms of maintenance work on the friction clutch.

The quick-action connection is preferably embodied in such a way that the parts can be mounted or removed without tools.

A friction clutch which can be electromagnetically actuated is known from the German laid-open publication DE 42 07 709 A1, in which a driven element runs at a corresponding speed to the drive unit when the friction disk clutch is engaged. In addition, the friction clutch comprises an eddy-current clutch with which a take-up speed can be realized. The eddy-current clutch is, however, intended for permanent attachment so that when the friction disk clutch is disengaged, the eddy-current clutch is always used.

Furthermore, it is particularly preferable if an eddy-current means of the eddy-current clutch, in which means the eddy currents form in the eddy-current mode, can be mounted and removed by means of the quick-action connection. It is, however, also conceivable that permanent magnet means, which have permanent magnets, can be mounted and removed by means of the quick-action connection. In each case, a significant element of the eddy-current clutch, with which the eddy-current clutch is respectively activated or deactivated, is attached or detached.

In a preferred embodiment, the permanent magnet means are fixedly attached to the driven element, for example to the fan impeller, whereas the eddy current means can be quickly detached from or attached to a flange, for example on a driveshaft. The quick-action connection preferably comprises a locking or snapping mechanism.

A quick-action connection is likewise conceivable which comprises keyhole-shaped openings on one part and compatible locking elements on another part of connectable parts. In this case, the locking elements can be inserted through the large region of the keyhole opening and can then be rotated into the small region so that a widened section of the locking elements comes into contact and the parts are prevented from being pulled apart in the direction of the axis of the locking elements.

So that an uninterrupted axial pressing force prevails, it is moreover preferred if spring means, for example plate springs, are provided which press a widened part of the locking elements of one part against the other part in the narrow section of the keyhole openings. The spring means can also be realized by means of correspondingly formed elastomeric elements.

Snapping connections preferably comprise spring arms and suitably formed regions on the connecting parts so that a snapping-in operation may occur.

A further essential aspect of the invention is that the eddy-current and/or permanent magnet means is distributed in an azimuthal or circumferential manner. This measure makes it possible to attach the eddy-current and/or permanent magnet means to shafts or to flanges which when viewed in the axial direction are already equipped with components which would make an axial arrangement of the eddy-current and/or permanent magnet means in one piece between these components impossible, since these components would not allow axial displacement of the eddy-current and/or permanent magnet means to the desired position by means of the predefined geometric measurements of the eddy-current and/or permanent magnet means.

Splitting up the eddy-current and/or permanent magnet means, however, allow these to be attached at any desired position, for example on an axle in a way which is independent of components in front or behind it, in particular with the previously discussed quick-action connection.

In a particularly preferred embodiment of the invention, the eddy-current and/or permanent magnet means have a plurality of, in particular two, ring segments. For example, the eddy-current means comprises one eddy-current cooling ring which is divided in two. So that the eddy-current effect in the ring is as homogenous as possible, the separation points engage for example in a jigsaw-like manner, so that in particular not only the separation point is closed but the ring segments are also fixed to one another. A ring composed in this way can then be attached to an assembly flange, for example of a driveshaft, on compatible bolts, for example by means of corresponding keyhole openings which are attached in a radially inwardly offset manner.

The described friction disk clutch can be engaged electrically, hydraulically or pneumatically.

BRIEF DESCRIPTION OF THE DRAWINGS

Several exemplary embodiments of the invention are illustrated in the drawings and are described in more detail in the following with indication of further advantages and details:

FIG. 6a shows a three-dimensional illustration of an assembly flange for holding an eddy-current cooling ring by means of a snapping mechanism with an eddy-current cooling ring in a position before it snaps in;

DETAILED DESCRIPTION OF THE INVENTION

Figure 1:
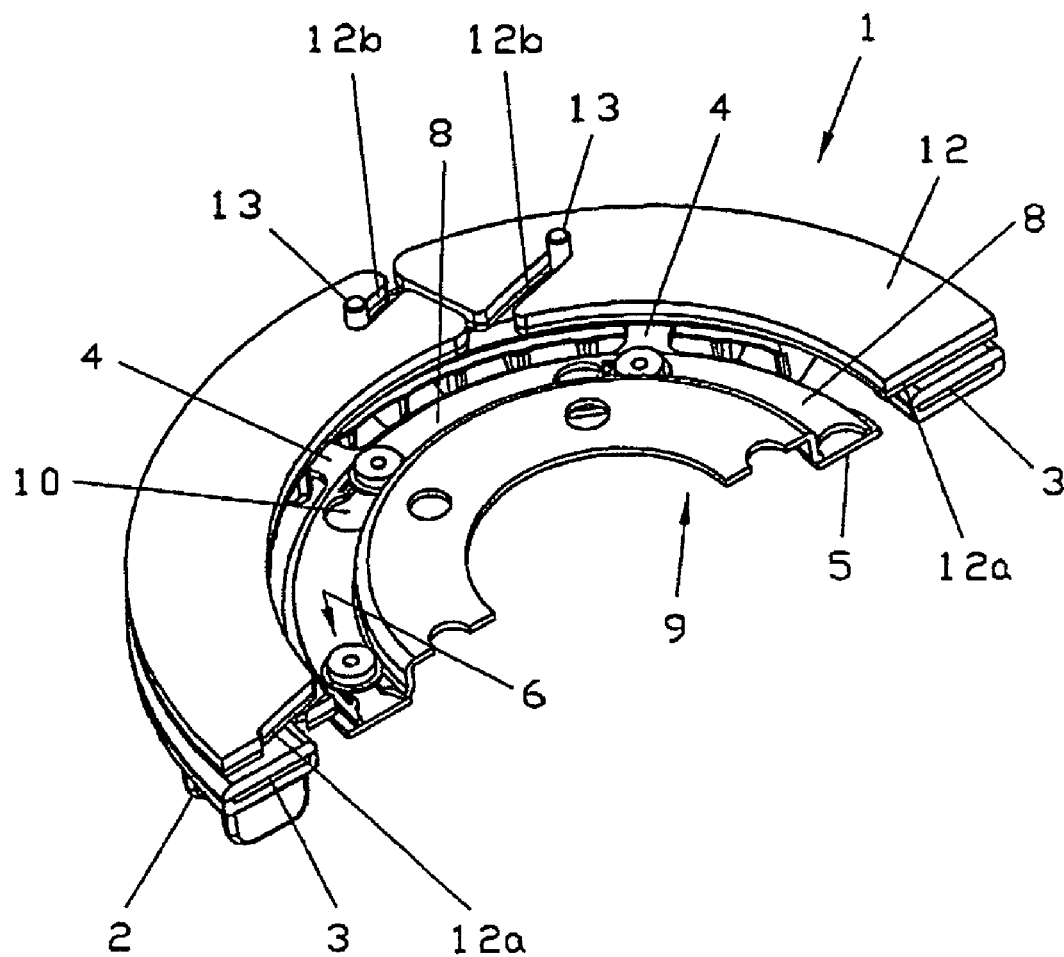
FIG. 1 shows an eddy-current cooling ring and a permanent magnet ring having a fastening means in a perspective view which has been cut in half.

FIG. 1 illustrates an eddy-current cooling ring 1 having cooling ribs 2 and a magnetic field coupling ring, for example a steel ring insert 3, which is, for example, cast in the eddy-current cooling ring 1. The remaining eddy-current cooling ring 1 can be composed for example of aluminum. A further steel ring 5 is attached in the eddy-current cooling ring 1 by means of webs 4. The steel ring 5 having the webs 4 can be embodied in one piece with the steel ring insert 3.

Figure 8:
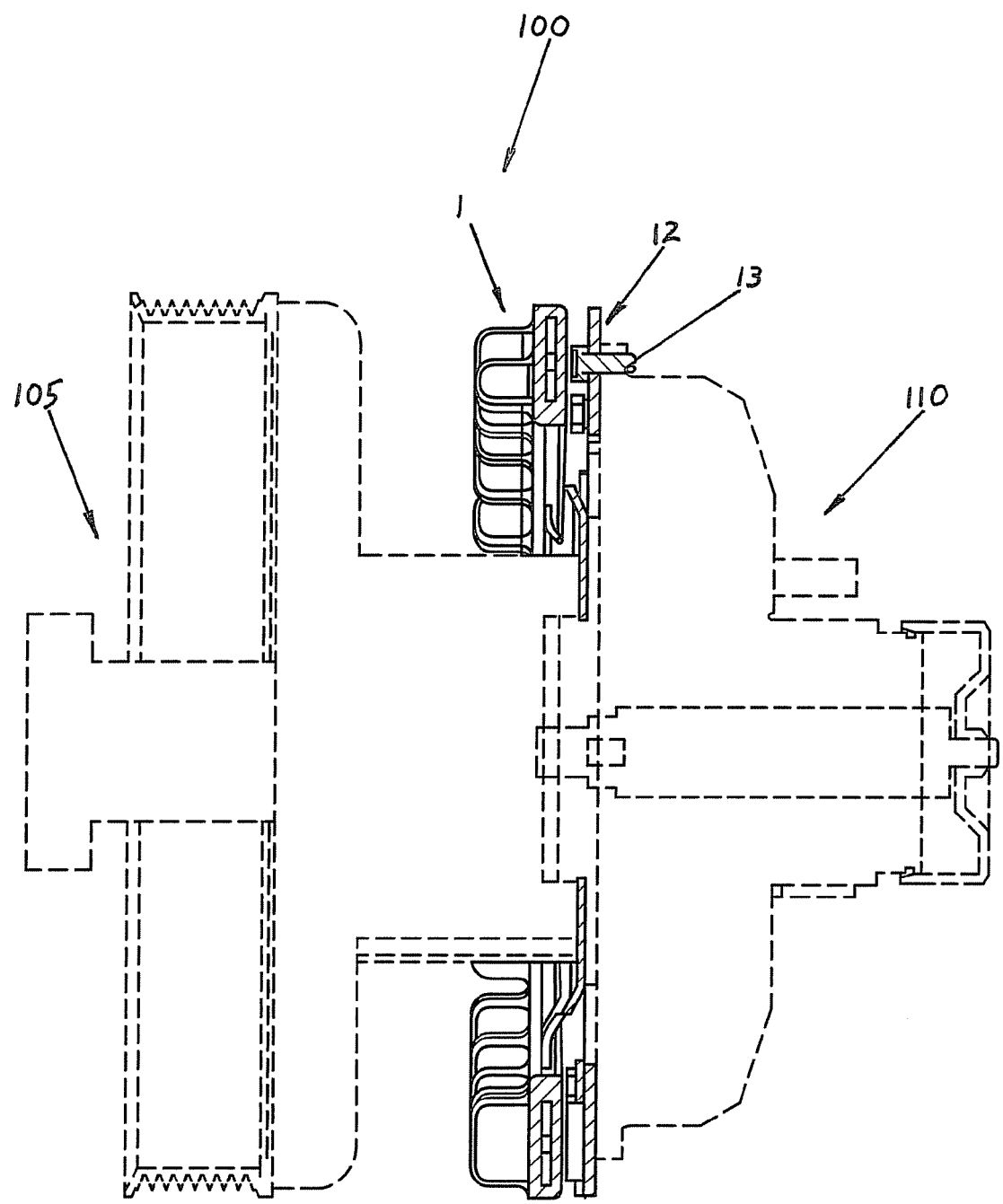
FIG. 8 shows the eddy-current cooling ring and the permanent magnet ring of FIG. 1.

The steel ring 5 has locking elements 6. The locking elements 6 comprise, for example, a bolt 7a having a head disk 7b which is arranged on the bolt 7a at a predefined distance from the surface of the steel ring 5. The distance should be dimensioned in such a way that at least the thickness of a fastening ring 8 of a fastening flange 9 can fit in between. The fastening flange 9 is fixedly mounted on, for example, a driveshaft 105 (FIG. 8) of a friction clutch 100 (FIG. 8).

A quick-action connection is realized between the eddy-current cooling ring 1 and the fastening flange 9 in the following advantageous manner:

The fastening ring 8 of the fastening flange 9 has keyhole-shaped openings 10, through the larger region of each of which the head disk 7b (see FIG. 2) can be inserted in order to be able to rotate the eddy-current cooling ring 1 in the direction of the respective narrow region of each of the openings, so that the fastening flange 9 and the eddy-current cooling ring 1 are axially fixed to one another.

The narrow region of the keyhole openings 10 is preferably aligned, in an azimuthal sense, in a direction which opposes an intended rotational direction of the eddy-current cooling ring 1. The fastening flange 9 can in this way be prevented from unintentionally rotating back to the larger region of the keyhole openings 10, as a result of which the eddy-current cooling ring 1 could become detached from the fastening flange 9 in an undesired manner.

In order to be able to compensate for geometrical fluctuations in the axial direction on account of tolerances and to obtain an uninterrupted axial pressing force, it can in addition be advantageous if a spring element, for example a plate spring 11 (see FIG. 5), is arranged between the head disk 7b and the surface of the steel ring 5.

In the assembled state of an eddy-current clutch (not illustrated as a whole), the fastening flange 9 sits, for example, as already described above, on a driveshaft, as a result of which the eddy-current cooling ring 1 correspondingly rotates at the driveshaft.

A permanent magnet ring 12 which is fixedly connected to a driven element 110, for example a fan impeller, for example by means of screw connections 13 is arranged opposite the eddy-current cooling ring 1 on a driven element 110 (FIG. 8) of the friction clutch (FIG. 8) with an air gap so that free rotational movement is possible. Permanent magnets are seated on the permanent magnet ring 12 and are symbolized in FIGS. 1 and 4 by the layer 12a.

In the exemplary embodiment, the permanent magnet ring 12 is split up and can be placed by means of slots 12b onto the, for example, previously assembled screws 13 which are then fully tightened in order to secure the permanent magnet ring parts. This approach allows the permanent magnet ring 12 to be mounted and removed in a simple manner at any time independently of axial occupation of the overall device.

The eddy-current cooling ring 1 in FIG. 1 is also divided at joints.

Figure 2:
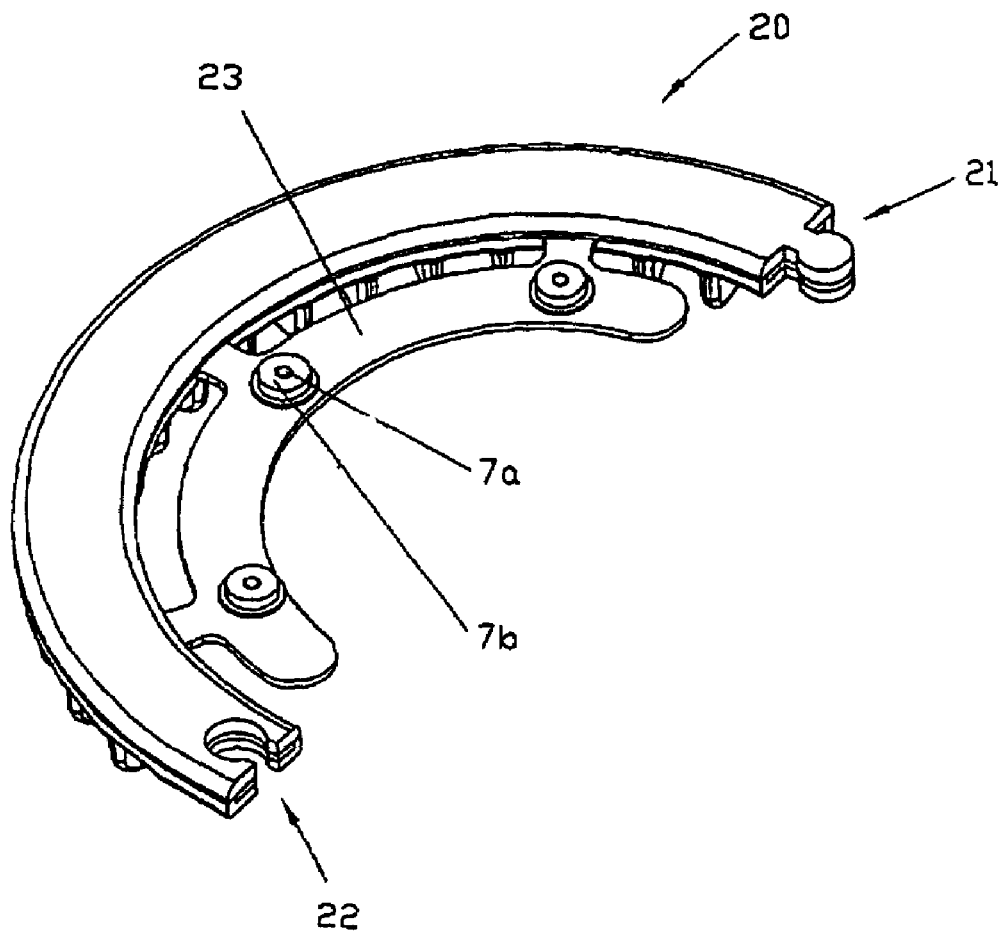
FIG. 2 shows an eddy-current cooling ring segment having a fastening flange in a perspective illustration.

FIG. 2 illustrates an eddy-current cooling ring segment 20 whose structure substantially corresponds to the eddy-current cooling ring 1 according to FIG. 1. The joints 21, 22 adjoining the next eddy-current cooling ring segment (not illustrated) are of jigsaw-like form in order both to keep the eddy current formation as homogeneous as possible and also to secure the eddy-current cooling ring segments mechanically to one another both in the radial direction and in the azimuthal direction.

In addition, the steel ring 5 in FIG. 1 is formed as a steel ring segment 23 in the embodiment of FIG. 2. In this case, all that is important is sufficient mechanical fastening to a fastening flange. In addition, symmetry should result in order to avoid imbalance in the rotational parts.

Figure 3:
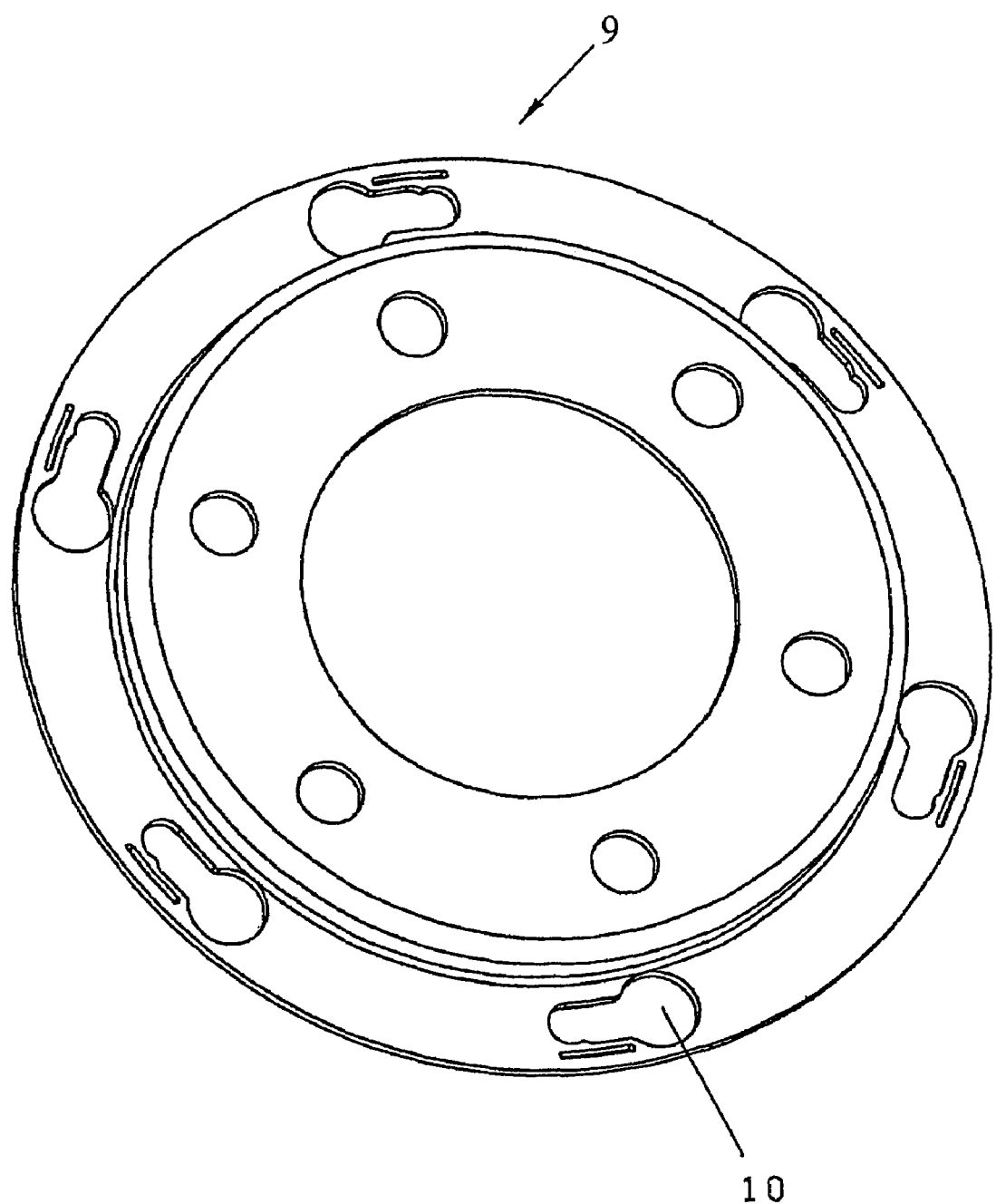
FIG. 3 has a holding flange for an eddy-current cooling ring or eddy-current cooling ring segments in a three-dimensional illustration.

FIG. 3 illustrates the fastening flange 9 having the keyhole openings 10 as a whole.

Figure 4:
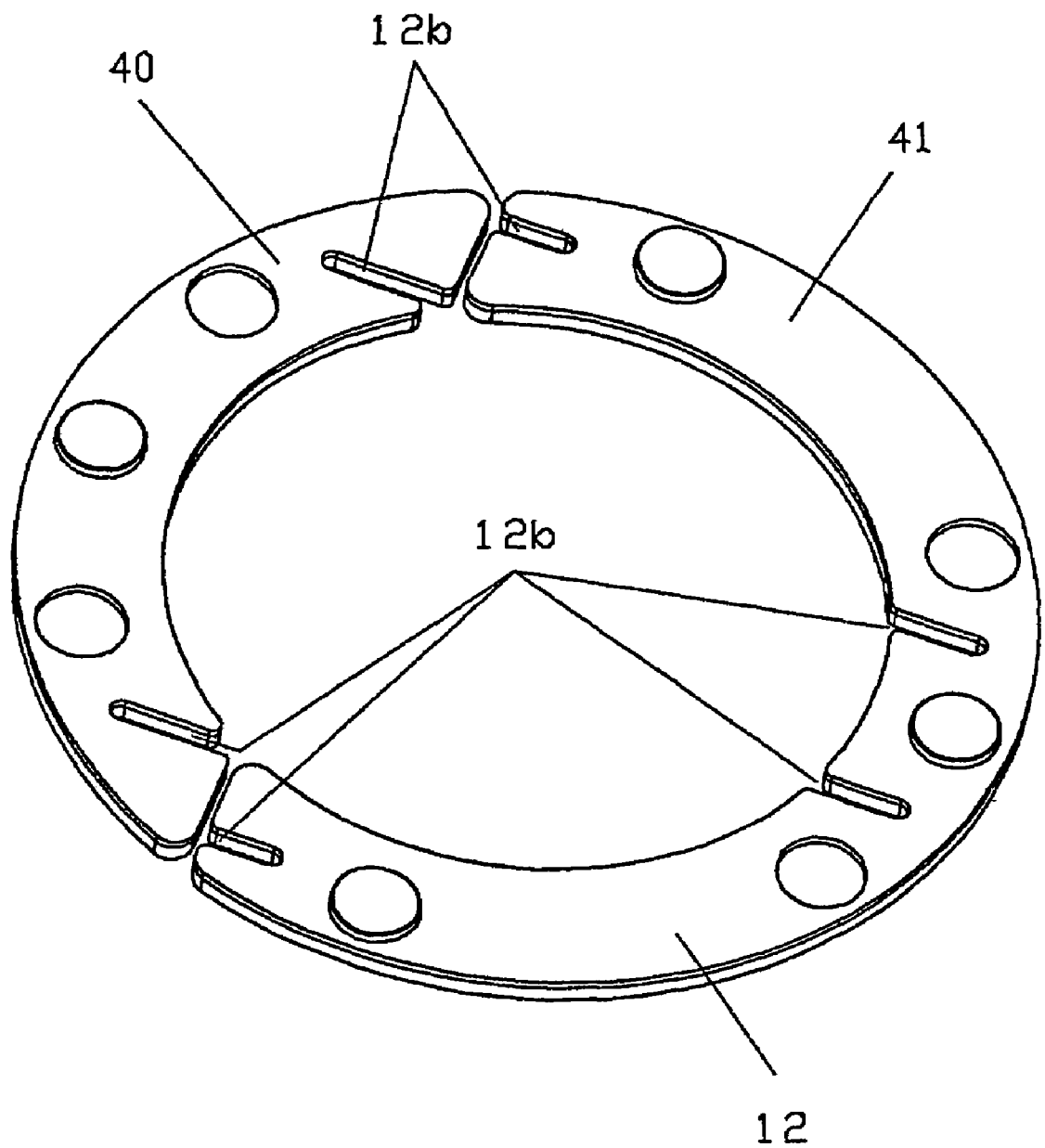
FIG. 4 shows a two-part permanent magnet ring in a perspective illustration.

FIG. 4 illustrates two permanent magnet ring segments 40, 41 as individual components which form the permanent magnet ring 12 having fastening slots 12b.

Figure 5:
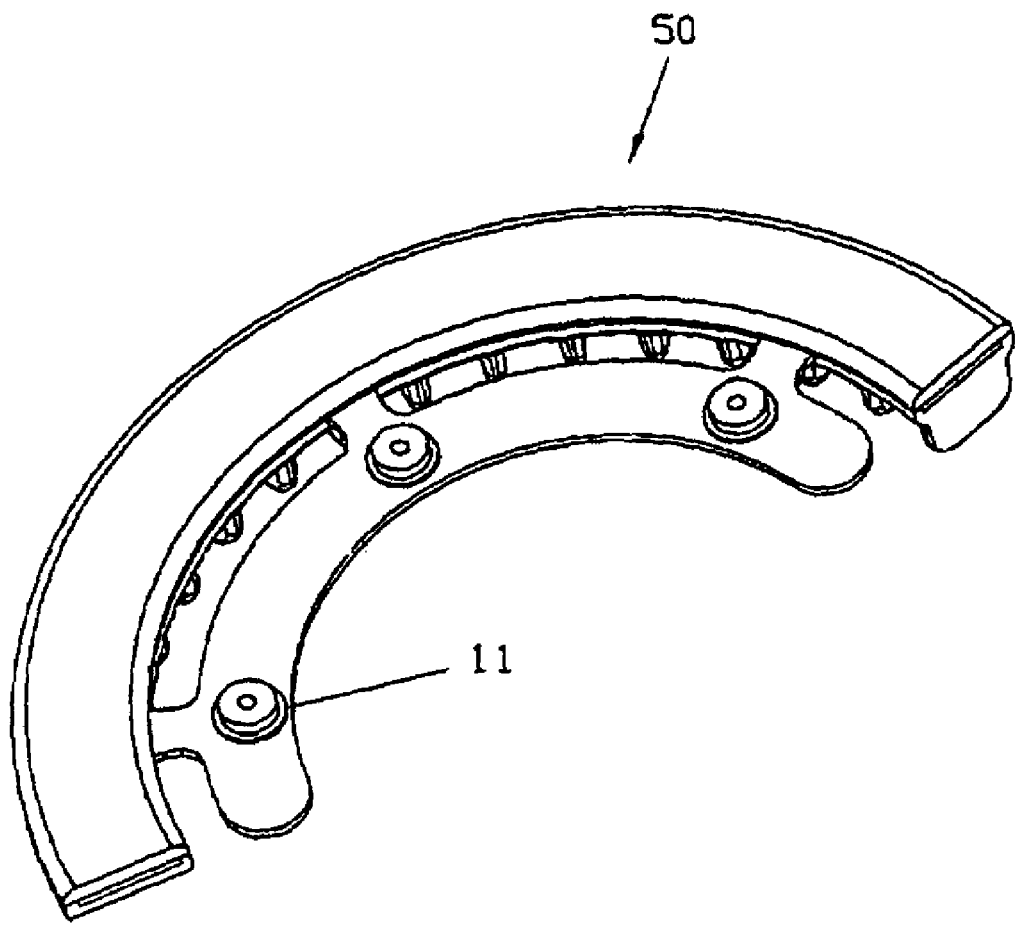
FIG. 5 shows a comparable segment of an eddy-current cooling ring to FIG. 2 but without interlocking geometry at the joints.

FIG. 5 shows an eddy-current cooling ring segment 50 which is constructed in the same manner as the eddy-current cooling ring segment 20 according to FIG. 2 but does not have jigsaw-like interconnecting geometry to the other eddy-current cooling ring segment at the joints.

Various further embodiments are advantageous in addition to a keyhole connection between the eddy-current cooling ring 1 or eddy-current cooling ring segments 20, 50 and a fastening flange 9.

Figure 6A:
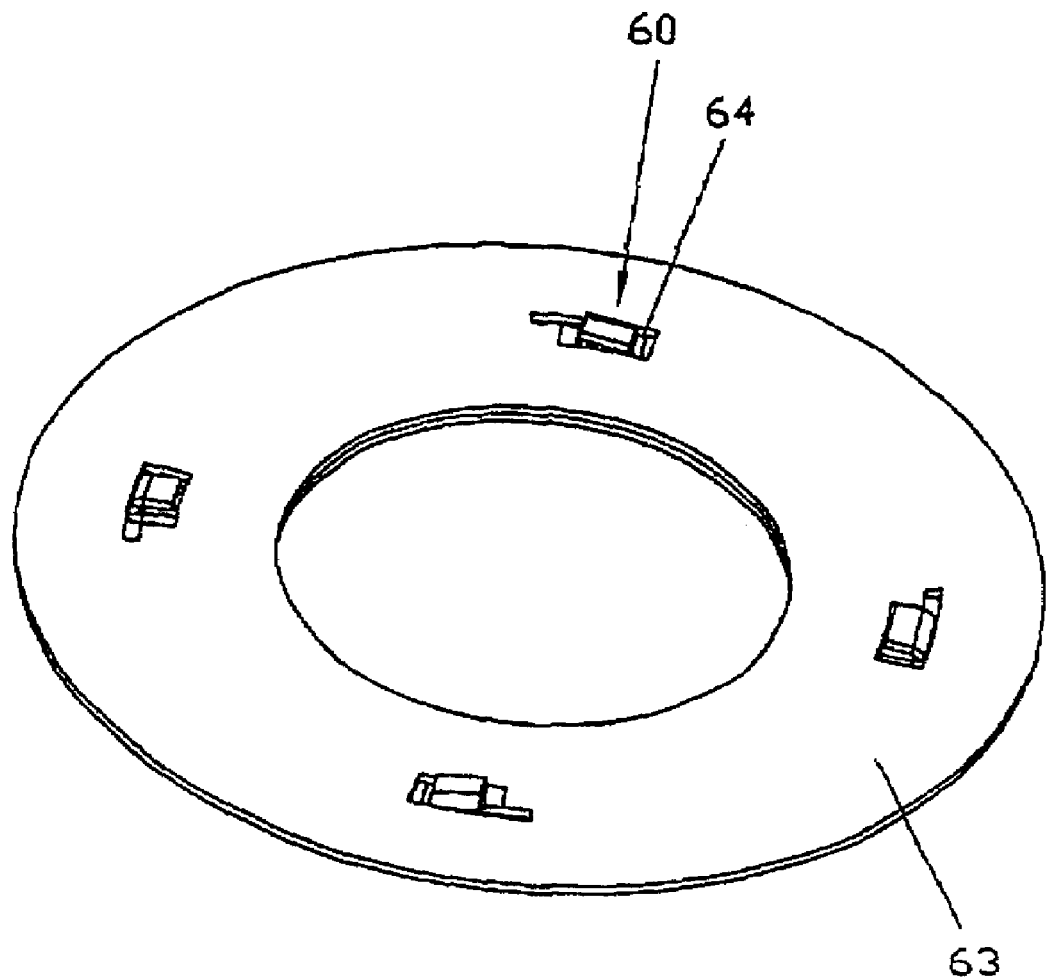
Figure 6B:
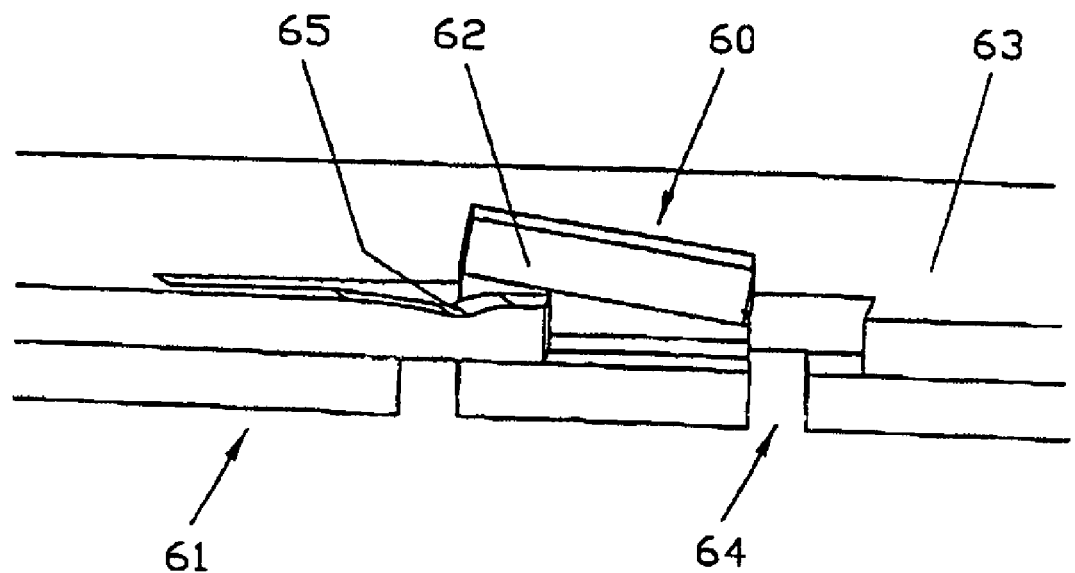
FIG. 6b shows a three-dimensional, partially sectional and enlarged illustration of the snapping mechanism according to FIG. 6a (in a corresponding position)
Figure 7A:
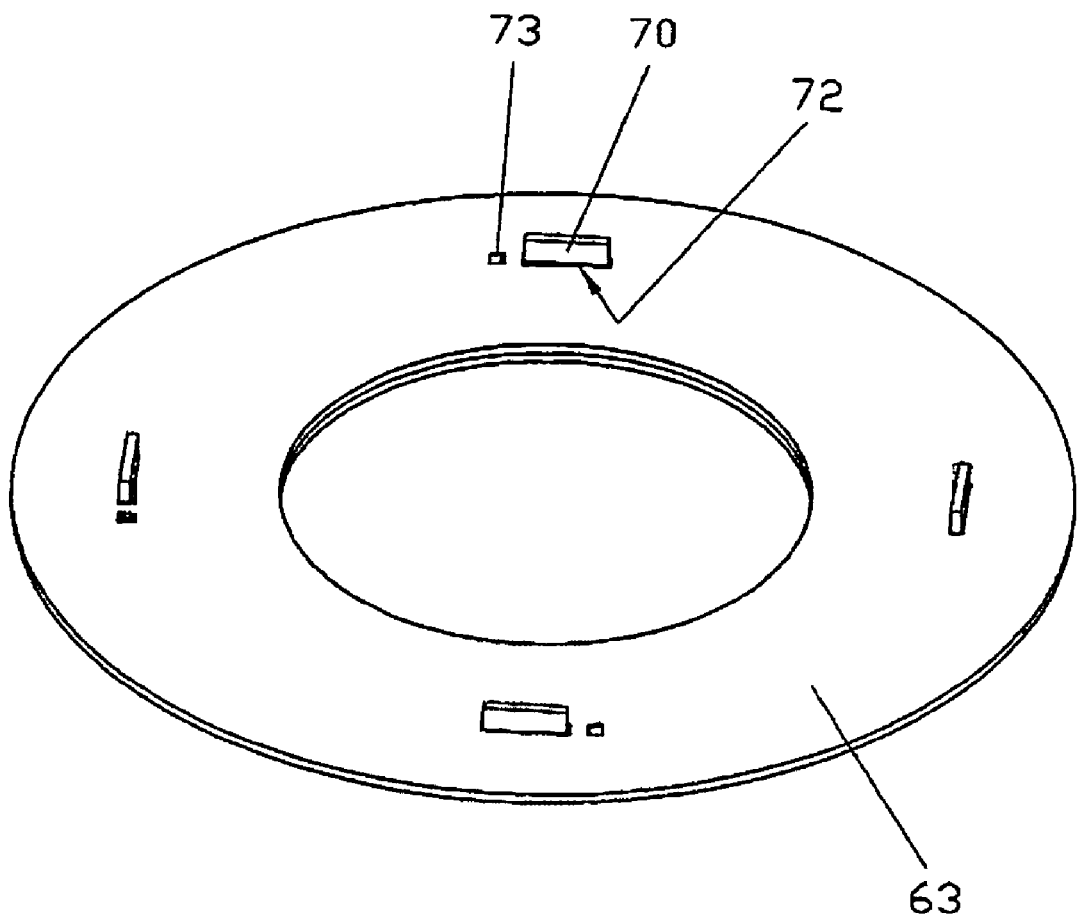
FIGS. 7a and b show comparable illustrations to FIGS. 6a and b but with a second embodiment of a snapping mechanism.
Figure 7B:
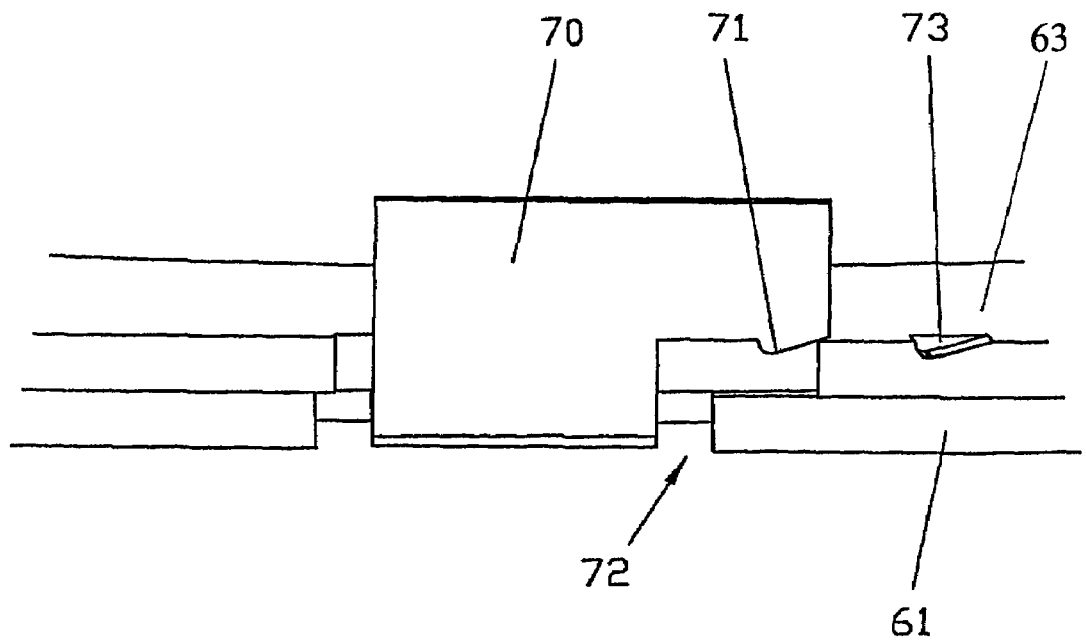

FIGS. 6a and 6b show a fastening facility in which a bent nose 60 of a fastening flange 61 having a slanted insertion wall 62 can be inserted through a compatible opening 64 in a steel ring 63 of the eddy-current cooling ring 1 or of a steel ring segment of the eddy-current cooling segments 20, 50. The portion of the insertion wall 62 which is at a smaller distance from the rest of the fastening flange 61 can snap into a prepared depression 65 by means of rotation. Instead of a slanted insertion wall 62, for example a projection 70, which has an engaging nose 71 and is bent up out of the fastening flange 61, is also possible as illustrated in FIGS. 7a and 7b. Said engaging nose 71 can snap into a corresponding recess 73 in the steel ring 63 when rotation occurs in a slot 72, which is compatible with the projection 70 and through which the projection 70 is inserted, in the steel ring 63.

FIGS. 6a to 7b each illustrate a state in which the engaging means are proceeding toward the engaged position.

The orientation of the engaging means should also be configured such that, for the intended direction of movement of the components of an eddy-current clutch, the corresponding components have the tendency to reach the engaged position and not vice versa. In this way, is possible to prevent for example the eddy-current cooling ring 1 or the eddy-current cooling ring segments 20, 50 from becoming unintentionally detached from a fastening flange 9, 61 from the fastening position.

FIG. 8 illustrates the eddy-current cooling ring 1 mounted to the drive shaft 105 of the friction clutch 100, the permanent magnet 12 attached to the driven element 110 of the friction clutch 100.

The invention claimed is:

1. A friction clutch for a driven element, the friction clutch comprising an eddy-current clutch comprising:
   a permanent magnet part; and
   an eddy-current part,
   wherein the permanent magnet part comprises a plurality of ring segments, and
   the eddy-current clutch is activated or deactivated by respectively mounting or removing one or more of the plurality of ring segments by means of a quick-action connection, which allows mounting or removal without any tools.

2. The clutch as claimed in claim 1, wherein the eddy-current part, in which eddy-currents form in an eddy-current mode, comprises a plurality of ring segments that can be mounted and removed by means of the quick-action connection.

3. The clutch as claimed in claim 1, wherein the quick-action connection comprises a keyhole-shaped opening on one part and a compatible locking element on another part of connectable parts, the keyhole-shaped opening having a larger diameter region and a small diameter region that are circumferentially offset from one another and having an open passage therebetween.

4. The clutch as claimed in claim 1, wherein the permanent magnet part is divided in an azimuthal or circumferential manner.

5. The clutch as claimed in claim 1, wherein the permanent magnet part has two ring segments.

6. A fan impeller comprising the friction clutch of claim 1.

7. The clutch as claimed in claim 1, wherein the plurality of ring segments of the permanent magnet part are arranged in a single plane.

8. A friction clutch for a driven element, the friction clutch comprising an eddy-current clutch comprising:
   a permanent magnet part; and
   an eddy-current part,
   wherein the eddy-current part, in which eddy-currents form in an eddy-current mode, comprises a plurality of ring segments arranged in a single plane that are divided in an azimuthal or circumferential manners, and
   the eddy-current clutch is activated or deactivated by respectively mounting or removing one or more of the plurality of ring segments by means of a quick action connection, which allows mounting or removal without any tools.

9. The clutch as claimed in claim 8, wherein the eddy-current part has two ring segments.

10. A fan impeller comprising the friction clutch of claim 8.

11. A friction clutch for a driven element, the friction clutch comprising an eddy-current clutch comprising:
    a permanent magnet part; and
    an eddy-current part,
    wherein the permanent magnet part comprises a plurality of ring segments arranged in a single plane that are divided in an azimuthal or circumferential manner, and
    the eddy-current clutch is activated or deactivated by respectively mounting or removing one or more of the plurality of ring segments by means of a quick-action connection which allows mounting or removal without any tools.

12. The clutch as claimed in claim 11, wherein the permanent magnet part has two ring segments.

13. A fan impeller comprising the friction clutch of claim 11.

14. A friction clutch for a driven element, the friction clutch comprising an eddy-current clutch comprising:
    a permanent magnet part; and
    an eddy-current part,
    wherein the eddy-current part comprises a plurality of ring segments arranged in a single plane, and wherein the eddy-current clutch is activated or deactivated by respectively mounting or removing one or more of the plurality of ring segments by means of a quick-action connection, which allows mounting or removal without any tools, and
    wherein the quick-action connection comprises a keyhole-shaped opening on one part and a compatible locking element on another part of connectable parts, the keyhole-shaped opening having a larger diameter region and a small diameter region that are circumferentially offset from one another and having an open passage therebetween.

15. A fan impeller comprising the friction clutch of claim 14.

16. A friction clutch for a driven element, the friction clutch comprising an eddy-current clutch comprising:
    a permanent magnet part; and
    an eddy current part,
    wherein the eddy-current part comprises a plurality of ring segments in a single plane, the permanent magnet part comprises a plurality of ring segments arranged in a single plane, and
    the eddy-current clutch is activated or deactivated by respectively mounting or removing one or more of the plurality of ring segments of at least one of the permanent magnet part and the eddy-current part by means of a quick-action connection, which allows mounting or removal without any tools.

17. A fan impeller comprising the friction clutch of claim 16.

* * * * *